J. R. HAMMOND.
Combined Hay Rake, Thrasher, Loader, and Stacker.
No. 97,395.
Patented Nov. 30, 1869.
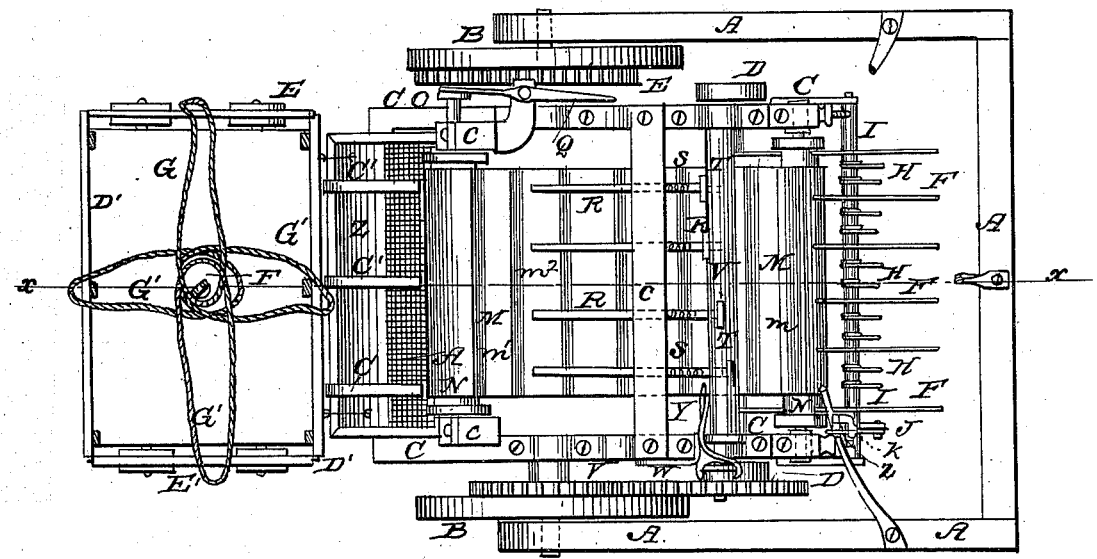

United States Patent Office.

JAMES R. HAMMOND, OF SEDALIA, MISSOURI.

Letters Patent No. 97,395, dated November 30, 1869.

COMBINED HAY-RAKE, THRESHER, LOADER, AND STACKER.

The Schedule referred to in these Letters Patent and making part of the same

*To all whom it may concern:*

Be it known that I, JAMES R. HAMMOND, of Sedalia, in the county of Pettis, and State of Missouri, have invented a new and useful Improvement in Hay-Rake, Thresher, Loader, and Stacker; and I do hereby declare that the following is a full, clear, and exact description thereof, which will enable others skilled in the art to make and use the same, reference being had to the accompanying drawings, forming part of this specification.

Figure 1 is a top view of my improved machine, part being broken away to show the construction.

Figure 2 is a vertical longitudinal section of the same, taken through the line $x\ x$, fig. 1.

Similar letters of reference indicate corresponding parts.

My invention has for its object to furnish an improved machine, which shall be so constructed as to collect the hay, thresh out the seed, and deposit the hay in a truck, in such a way that the whole load can be conveniently raised at once, and deposited upon a stack or in a mow; and It consists in the construction and combination of the various parts of the apparatus, as hereinafter more fully described.

A is the outer frame of the machine, to the forward end of which the draught is attached, and to the rear parts of which are attached, or in them are formed, the bearings for the outer ends of the journals of the wheels B, which serve both as truck and drive-wheels for the machine.

The inner ends of the journals of the wheels B revolve in bearings attached to the inner frame C, which swings upon the said journals.

When the machine is operated, the forward end of the frame C rests upon the small wheels D, attached to the ends of the shaft E, which revolves in bearings attached to the under side of the forward part of the said frame C.

F are the rake-teeth or lifters, the rear ends of which are connected with and ride upon the shaft E, and which pass over and rest upon the guard-bar G, the ends of which are secured to the forward end of the frame C, and which raises the said teeth F away from the ground, when the forward end of the frame C is raised, and which allows the said teeth to rise freely and independently, to pass over obstructions.

The forward ends of the teeth or lifters F are bent back, and inclined rearward and upward, so that as the machine is drawn forward, the said teeth may pass beneath the hay, and raise or lift it, so that it may pass upon the carrier.

H are gleaner-teeth, which are rigidly attached to the bar I, working in bearings or supports attached to the forward end of the frame C, and which are designed to collect the fine hay and trailings left by the lifters F, and raise it until it may be caught and carried up by the teeth of the carrier.

To the bar or shaft I, is rigidly attached a short arm, J, to the end of which is pivoted the lower end of the bar K, which passes up into such a position that it may be easily reached and operated by the driver, to raise the gleaners H to raise the hay collected by said gleaners, so that the carrier-teeth may more conveniently take hold of said hay.

The bar K also serves to enable the driver to raise the forward end of the frame C, and the attachments of said frame, away from the ground, to pass obstructions, or for convenience in passing from place to place.

Upon the side of the bar K, are formed notches, to catch into a catch, L, supported from the frame A, to hold the frame C securely supported when adjusted in position.

M is the carrier, which is formed by attaching cross-bars, $m^1$, provided with teeth or fingers, to an endless apron, $m^2$, made of canvas, or other close and suitable material, that will retain and carry up the seed beaten out of the hay.

The carrier M passes around the rollers N, the lower one of which revolves in bearings placed in slots in the lower end of the frame C, and provided with screws and nuts, so that the tautness of the carrier-belt may be adjusted as required.

The upper roller N works in bearings in standards $c^1$, attached to the upper or rear end of the frame C, and upon one of its journals is placed a gear-wheel, O, which is connected with said journal, by a feather and groove, so that it may carry the said roller with it in its revolutions, and, at the same time, slide upon said journal, to enable it to be thrown into and out of gear with the gear-wheel P, attached to one of the wheels B, as required.

Q is a lever, pivoted to some suitable support, and the forked end of which rides upon a groove formed upon the hub of the gear-wheel O, so as to throw the said gear-wheel into and out of gear with the gear-wheel P.

R are lever-beaters, pivoted to a bar, S, the ends of which are attached to standards $c^2$, attached to the middle parts of the side-bars of the frame C.

T are cams formed upon or attached to the roller U, which, as the said roller revolves, force down the forward ends of the beaters R, and raise the upper ends of said beaters, so that as their forward ends escape from the cams T, their rear ends may be forced down, with a short, quick stroke upon the hay passing beneath them, upon the carrier M, threshing out the seed.

The stroke of the beaters R is made quick and forcible by coiled or equivalent springs, S', attached to the bar $c^3$, connecting the upper ends of the standards $c^2$, and which are connected with the said beaters R.

The cam-roller U is revolved from one of the drive-wheels B, by suitable gearing, V W, which should be so arranged as to revolve the said cam-roller U with a rapid motion.

Y is a lever, pivoted to some suitable support, and the forked end of which rides upon a groove in the hub of the wheel W, so that the said gearing may be thrown out of and into gear when desired.

From the upper end of the carrier M, the seed threshed out by the beaters R falls into the hopper Z, from which it passes to the screen A', placed upon the top of the seed-box B', attached to the frame C, into which the seed passes, the chaff escaping between the lower edge of the rear side of the hopper Z and the upper edge of the rear side of the box B'.

C' are fingers attached to the upper edge of the hopper Z, and extending up to the upper end of the carrier M, to receive the hay from said carrier and conduct it to the truck-rack D'.

The truck-rack D' is mounted upon small wheels, E', and its sides and ends may be rigidly or detachably connected with each other. I prefer to connect them detachably, so that the rack may be loosened to allow the hay to be more easily raised from it.

The truck-rack D' E' is detachably connected with the frame C of the machine, so that it may be drawn forward by and with said machine while being filled, and when filled, readily detached and drawn to the stack or mow where the hay is to be deposited.

F' is a pole or bar, the lower end of which fits loosely into a socket formed for its reception in the bottom of the rack D'.

In the upper end of the pole F', is formed, or to it is attached, an eye, to receive the hook of the hoisting-rope, by which the hay is raised upon the stack, or into the mow where it is to be deposited.

G' are looped ropes, through the lower part of which the lower end of the pole F' is passed, when arranging the rack to receive the hay from the carrier M.

The upper parts of the looped ropes G' are laid over the sides and ends of the rack D', as shown in figs. 1 and 2.

When the rack D' has been filled, and drawn to the place where it is to be unloaded, the upper parts of the looped ropes G' are brought together, and passed over the hook of the hoisting-rope, by means of which the hay is to be raised to its place.

When the hoisting-apparatus is operated, the looped ropes G' will raise the hay and the pole F' out of the rack D', the strain upon said looped ropes causing them to be drawn tightly upon the lower part of the said pole F'.

When the hay has been deposited in the desired place, the hoisting-apparatus is slightly slackened, and the hook removed from the looped ropes G', and hooked into the eye of the pole F', or hooked into said eye, without being detached from the said looped ropes G'. Then, as the hoisting-apparatus is again started, the pole F' is drawn upward, so as to release the lower parts of the looped ropes G', leaving the hay deposited in the desired place.

Several of the truck-racks D' E' F' G' should be used, so that one may be drawn away and emptied while another is being filled.

Having thus described my invention,

I claim as new, and desire to secure by Letters Patent—

1. An improved hay-rake and loader, formed by the combination of the frame A, wheels B, inner frame C, wheels and shaft D E, teeth or fingers F, guard-bar G, and carrier M N, with each other, substantially as herein shown and described, and for the purpose set forth.

2. The combination of the gleaner H I, arm J, and catch-bar K, with the frames C and A, rake-teeth or fingers F, and carrier M, substantially as herein shown and described, and for the purpose set forth.

3. The threshing-device R S S' T U, in combination with the frame and carrier of a hay-rake and loader, substantially as herein shown and described, and for the purpose set forth.

4. The combination of the hopper or guide Z, screen A', and seed-box B', with the frame C, carrier M, and threshing-device R S S' T U, of a hay-rake and loader, substantially as herein shown and described, and for the purpose set forth.

5. The combination of the looped ropes G', and detachable pole F', with the rack D', substantially as herein shown and described, and for the purpose set forth.

6. The combination of the truck-rack D' E' looped ropes G', and detachable pole F', with the frame C and carrier M of the hay-rake and loader, substantially as herein shown and described, and for the purpose set forth.

JAMES R. HAMMOND.

Witnesses:
EUGENE S. CROUSE,
WM. H. H. HILL.